Sept. 10, 1968            E. S. FOSTER            3,401,253

METHOD OF AND APPARATUS FOR METALLURGICALLY JOINING MATERIALS

Filed Sept. 11, 1964            6 Sheets-Sheet 1

FIG. 1.

Sept. 10, 1968      E. S. FOSTER      3,401,253

METHOD OF AND APPARATUS FOR METALLURGICALLY JOINING MATERIALS

Filed Sept. 11, 1964      6 Sheets-Sheet 2

WITNESSES:
John L. Chopp
James F. Young

INVENTOR
Edwin S. Foster
BY
Hymen Diamond
ATTORNEY

United States Patent Office

3,401,253
Patented Sept. 10, 1968

3,401,253
**METHOD OF AND APPARATUS FOR METAL-
LURGICALLY JOINING MATERIALS**
Edwin S. Foster, Pittsburgh, Pa., assignor to Westinghouse Electric Corporation, East Pittsburgh, Pa., a corporation of Pennsylvania
Filed Sept. 11, 1964, Ser. No. 395,800
5 Claims. (Cl. 219—121)

ABSTRACT OF THE DISCLOSURE

Method and apparatus for welding thin walled tubing, of the order of .01 inch, to spacers, in the practice of which the tubes and spacers are mounted in a fixture which is in a chamber of an electron beam generator while defining joints to be welded. The electron beam is aligned with the joint on a run-on-run-off tab and then the joint is moved relative to the beam by a motor, with the beam in welding relationship with the joint, from this run-on-run-off tab to another at the other end of the joint.

---

This invention relates to metals joining and has particular relationship to fabricating pressure-tight assemblies by precision welding of parts, at least one of which is thin-walled. Certain power generating apparatus includes crossed arrays of tubes, each array including a plurality of thin-walled tubes having a wall thickness of the order of one hundredth of an inch. These tubes are formed into a rigid structure by spacers of ferrules which are interposed between successive tubes. Each spacer is to be metallurgically joined to the tubes to which it is contiguous by welding but it is important that the welds shall not penetrate through the walls of the tubes. To assure a firm joint between each spacer and its contiguous tubes, it is also necessary that the welds penetrate a predetermined distance; typically the penetration of the welds into the walls of the tubes should be approximately 50%. Since the tubes are of small thickness this demands that the welding be carried out with high precision. Attempts were made to produce the metallurgical bonds between the spacers and the tubes by tungsten-arc inert-gas-shielded welding. These attempts proved unsuccessful; the necessary precision to achieve the prescribed penertation without breaking through the inner surfaces of the tubes could not be achieved and to the extent that the desired penetration was achieved, the results were not reproducible. In attempting to produce the metallurgical joints by tungsten-arc welding, a number of preliminary welds were made to determine the parameters. Subsequently, in the making of later welds by tungsten-arc welding with the parameters set as determined the welds produced differed materially as to penetration and as to soundness from the welds originally produced.

It is accordingly, an object of this invention to provide a method and appaartus for fabricating an assembly of thin-walled tubes and spacers in which the spacers are precisely welded to the tubes with welds having precisely predetermined penetration into the walls of the tubes.

This invention arises from the discovery that the precision demanded in the welding of spacers to thin-walled tubes of an assembly of the type just described can be achieved by electron-beam welding the spacers to the tubes. In electron beam welding of a joint, such as that between a spacer and a tube, the parameters which may be varied are the rate at which the weld is produced; that is, the rate at which it is moved relative to the beam, the welding current and the welding voltage. It has been discovered that by proper presetting of the parameters of the electron beam, the welding current and the welding voltage, and the rate of relative movement, the required precision for welding the spacers to the thin-walled tubes may be achieved.

In accordance with this invention, electron-beam welding apparatus is provided which includes a movable carriage bearing, a fixture for mounting the tube assembly so that it may be moved by the carriage into position to by welded by the beam. The tubes and spacers are mounted in this fixture with each spacer positioned between successive tubes so that it forms a joint to be welded with each of the tubes to which it is contiguous. In the practice of this invention, the welding-electron-beam generator is provided with deflecting means and at the beginning of each welding operation is deflected precisely to a position such that as the fixture advances the tube assembly the beam passes over a joint in welding relationship with the joint and fuses the metal at the joint. For the proper setting of the beam and to properly carry out the welding operation, run-off-run-on tabs secured to the fixture extend over the tubes and spacers at the ends of the joint.

In the welding of any spacer to a contiguous tube, the electron beam is initially centered on one of the tabs. It is then deflected on the tab to the position which is along the extension of a joint to be welded. The fixture and tube and spacer assembly is then moved relative to the beam so that the beam moves from a run-off tab along the joint, welding the joint and then moves onto a run-on tab where it may be set for the welding of another joint.

Stated another way, in the welding of a spacer to thin-walled tubes, in the practice of an aspect of this invention, a method is followed which comprises placing said spacer between said tubes thus forming joints to be welded between each of said tubes and said spacer, providing run-off-run-on tabs at the ends of said joints along the direction of said joints, and joining said spacer to said tubes at each of said joints as follows:

(a) Centering said spacer with respect to said beam in its undeflected position, (b) Setting said spacer and tubes relative to said beam so that said beam impinges on one of said tabs, (c) Deflecting said beam so that said beam impinges at a point of said one tab, which point is along the extension of a said joint, and (d) Moving said spacer and tubes and said beam relative to each other so that said beam progressively impinges along said last-named joint, producing a weld at said joint, and at the end of said joint said beam impinges on said other tab, the parameters of the beam and the rate of said relative movement being preset so that said weld is produced wtih the required reproducible precision.

In arriving at this invention, it has been discovered that to achieve the desired precision of welding, it is important that the run-off-run-on tabs be parallel to the joint to be welded and also be as near to the joint as practicable. Substantial displacement of the run-on-run-off tabs from the joint or inclination of the tabs to the joint tend to introduce errors which result in unsatisfactory joining. In arriving at this invention it has also been discovered that the electron beam should overlap both the tube and the spacer at each joint but that the overlap should be such that the larger portion of the electron beam extends over the spacer and the smaller portion over the tube. Typically, the relationship may be such that the portion of the beam corresponding to approximately one-third of its diameter extends over the tube and the portion corresponding to the other two-thirds of the diameter extends over the spacer.

Certain novel features considered characteristic of this invention are disclosed generally above. For a better understanding of this invention, both as to its organization and as to its method of operation, together with additional objects and advantages thereof, reference is made to the following description taken in connection with the accompanying drawings, in which:

FIG. 1 through 4 show a typical tube assembly in the form of a cruciform which is fabricated in the practice of this invention. The cruciform is composed of four vanes V1, V2, V3, V4. Each vane includes a linear array of tubes 21 which are held together by spacers or ferrules 23. The opposite vanes V1 and V3 and V2 and V4 are held together at the center to form the cruciform by spacers or ferrules 25 which are longer than the ferrules between the tubes of the separate vanes. The spacers 23 or 25 engage the tubes 21 to which they are contiguous along joints 27 and 29 which are to be welded. The joints are welded in the practice of this invention. In explaining the practice of this invention, it is convenient to refer to the opposite surfaces of each of the vanes. One surface of each of the vanes V1, V2, V3 and V4 is identified as T1, T2, T3 and T4. The other surface of each of the vanes V1 through V4 is identified as B1, B2, B3 and B4.

Figure 4:
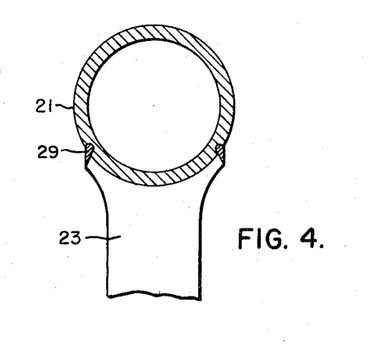
FIG. 4 is a view in end elevation enlarged showing a satisfactory metallurgical bond between a spacer and a contiguous tube.

Typically the thickness of the walls of the tubes 21 is of the order of .01 inch. It is essential that there be no leakage through the walls of the tubes and to achieve this purpose the welds between the spacers 23 or 25 and the contiguous tubes must be precisely formed and the weld penetration must be substantially less than the thickness. Typically, the penetration should be about 50%. In a welded joint as shown in FIG. 4 the penetration is between .004 inch and .008 inch in a tube which has a thickness of approximately .017 inch.

To achieve the desired precision in the welding, the joints 27 between the spacers 23 or 25 and the tubes 21 are welded according to this invention by electron-beam welding with a high voltage, low current electron beam. Typically, the voltage across the beam may be of the order of 60 to 115 kilovolts. The beam current may vary between 1 and 2 milliamperes.

Figure 5:
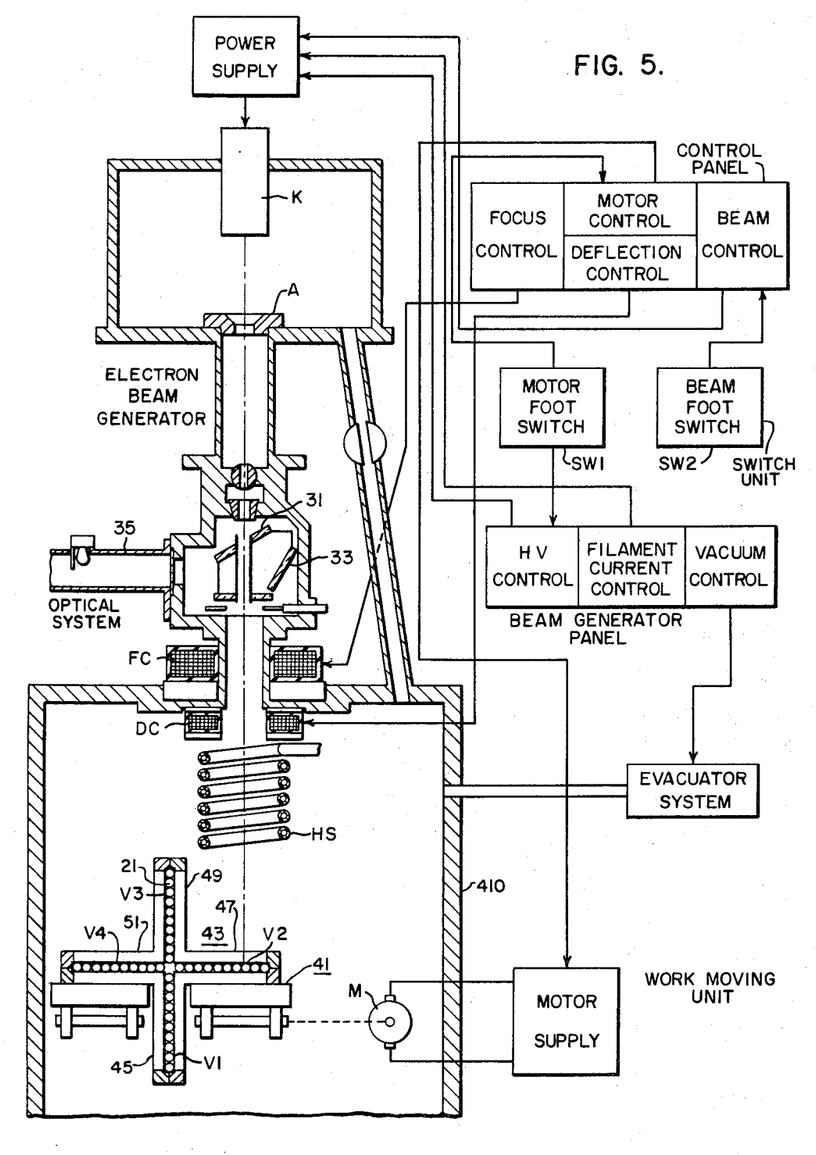
FIG. 5 is a diagrammatic view showing apparatus for producing an assembly as shown in FIG. 1.

The electron-beam welding apparatus (FIG. 5) includes an Electron Beam Generator, a Work Moving Unit, an Optical System, a Control Panel for controlling the movement of the work and the electron beam. a Beam Generator Panel for setting the Electron-Beam Generator into operation and a Switch Unit for producing the operation of the Generator. The Electron Beam Generator produces a high voltage, low current electron beam which is set in welding relationship with the work in the Work Moving Unit with the aid of the Optical System. The Control Panel serves to focus the beam, adjust its current and control the work drive motor M and the deflection of the beam. The supply of voltage for the Beam Generator and the operation of the vacuum equipment for the apparatus is controlled by the Beam Generator Panel. The actual operation of the apparatus in producing a weld is carried out responsive to the actuation of foot switches SW1 and SW2, one of which SW1 operates the drive motor M which advances the work and the other of which SW2 causes the electron beam to be energized. Typically, switch SW2 applies unblocking potential to the blocking grid of the gun K.

The Electron Beam Generator includes an electron gun assembly K (including the usual filament and blocking grid) (not shown), an anode A, a focusing coil FC and a deflection coil DC. The Generator includes a power supply which supplies the gun K with heating current and impresses a high potential between the gun K and the anode A to produce an electron beam. The beam is focused by the focusing coil FC and may be deflected to any desired position along a joint 27 or 29 (FIG. 3) by impressing direct current on the deflecting coil DC. In a deflected position alternating current may be impressed on the coil DC to oscillate the beam along the joints 27 or 29 or perpendicular to the joint during welding. In the preferred practice of this invention the beam is not oscillated. The Generator may also include a water cooled heat shield HS (FIG. 5) which absorbs the vapor from the weld and prevents the vapor becoming deposited on the Optical System.

Figure 10:
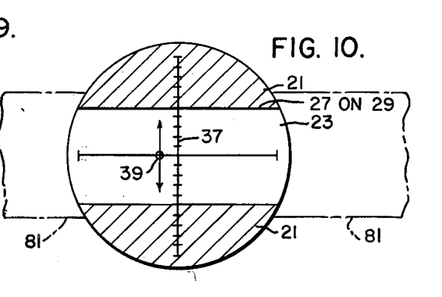
FIG. 10 is a reproduction of the image of a spacer and contiguous tubes as they would appear in the telescope of the apparatus shown in FIG. 5; the adjacent run-off-run-on tabs are shown in broken lines to show the relationship between the tabs and the spacer.

The Optical System includes a reflector 31 and 33. Light emitted from any point on the work where the beam impinges is reflected by reflector 31 generally downwardly at an angle to the beam to reflector 33 which reflects the light also in a horizontal direction through a telescopic eyepiece 35. A limited portion of the work on which the electron beam impinges may be viewed through the telescopic eyepiece. A typical view of the optical field of the eyepiece is shown in FIG. 10. In this case, the image of a spacer 23 appears in the center of the field. On both sides of this spacer images of the tubes 21 to which the spacer is to be joined can be seen. The images of the points 27 and 29 to be welded are at the intersections of the image of the spacer and of the tubes.

The Optical System is provided with a graduated scale 37 (FIG. 10) having a zero graduation which should be set coincident with the center of the spacer 23. The point 39 of impingement of the electron beam is shown centered along the zero graduation. The necessary deflection of the beam can be determined by observing the graduation on both sides of the zero graduation.

The Work Moving Unit includes a carriage 41 driven by motor M so as to advance work in position to be welded by the electron beam. Typically the carriage 41 may extend into an elongated tube 410 in communication with the chamber including the Electron Beam Generator and may be loaded with the work at the end of this tube remote from the Generator and moved along this tube so that the work is progressively impinged by the beam. A typical electron-beam welding apparatus including a carriage is disclosed in Burton et al. Patent 3,093,726.

Figures 6, 7, 8:
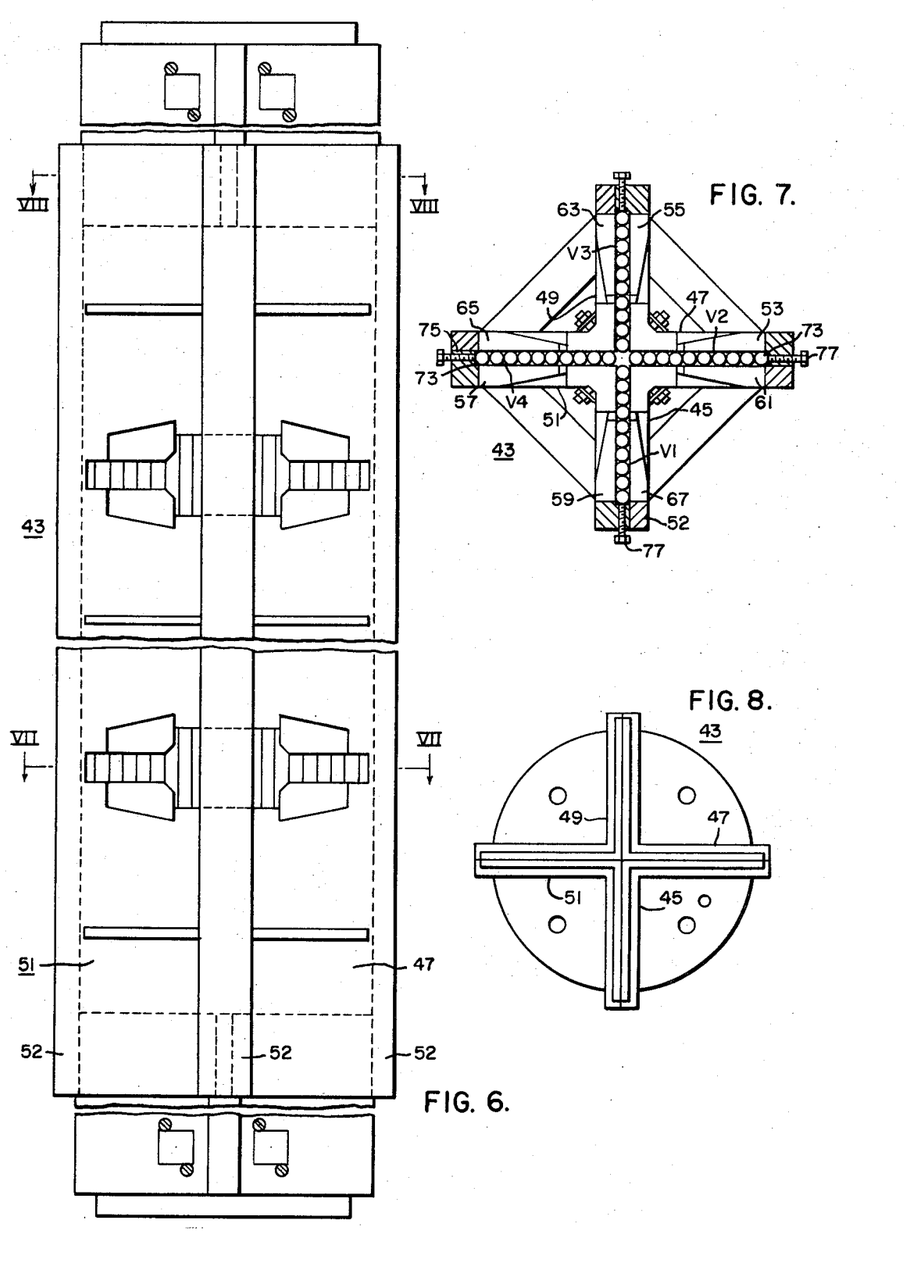
FIG. 6 is a plan view of a fixture, included in the apparatus shown in FIG. 5, for supporting the tube assembly shown in FIG. 1 in position to be welded in the practice of this invention.
FIG. 7 is a view in section taken along line VII—VII of FIG. 6.
FIG. 8 is a view in section taken along line VIII—VIII of FIG. 6.

The carriage carries a fixture 43 (FIGS. 6, 7, 8, 11) in which the vanes V1, V2, V3 and V4 are mounted for welding. This fixture 43 includes a plurality of angles 45, 47, 49, and 51 having overhanging lips 52. Each angle is mounted with its legs in abutting relationship with the legs of two associated angles so as to form a cruciform. Two of the angles 47 and 51 have thicker legs 53 and 55 and 57 and 59 respectively, than the other two and the angles are mounted with a thinner leg 61, 63, 65, 67 abutting a thicker leg 53, 55, 57, 59 respectively (FIG. 7). The angles 45, 47, 49, 51 are secured together to form a rigid structure by bolts 71 extending through the overhanging lips 52 of abutting legs 53 and 61 and 57 and 65. The thicker legs 53, 55, 57, 59 each has a ledge 73 so that grooves for depositing the tubes 21 of the vanes V1, V2, V3, V4 are formed between each thicker leg and the abutting thinner leg. The line of division 75 between the abutting sides of the legs is in each case coextensive with the side of this groove which is at the termination of the thicker legs 53, 55, 57, 59. The tubes 21 and spacers 23, 25 are disposed in the grooves to form the cruciform and are secured by set screws 77 extending through the ends of the thicker legs.

Figure 11:
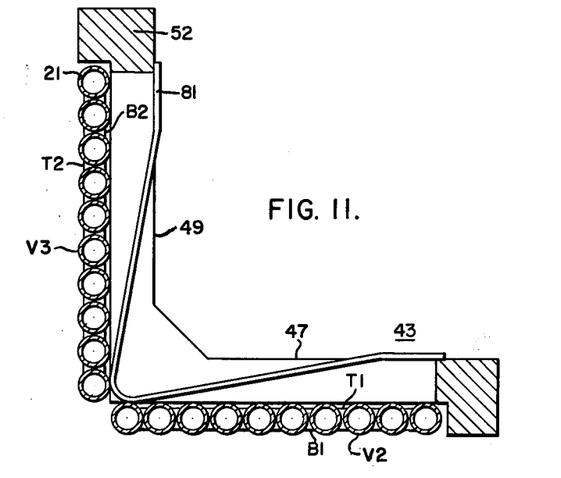
FIG. 11 is a view in end elevation of a part of an assembly showing the tabs and their relationship to the tubes and the spacer.

The fixture is provided with run-on-run-off tabs 81 at both ends of the joints 27 to be welded (FIG. 11). These tabs are in the form of angles which are bolted to the lips 52 of the overhang and extend over the surfaces of the tubes 21 as closely as practicable to these surfaces.

Figure 9:
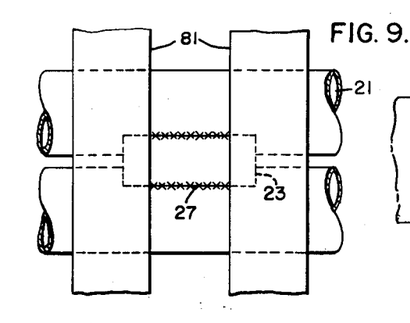
FIG. 9 is a view in top elevation showing the relationship between a spacer and contiguous tubes and the run-off-run-on tabs used in the practice of this invention.

The four angles 45, 47, 49, 51 which form the fixture are assembled into a rigid fixture with the tubes 21 of the vanes V1 through V4 and the spacers 23, 25 positioned for welding. For this purpose the angle 51 which defines one of the quadrants (the third quadrant regarded trigonometically) is placed on a bench or table (not shown) with the tips of its legs 57 and 59 engaging the table and extending at angles of approximately 45° to the table. The tubes 21 and spacers 23 which form vanes V1 and V4 are then slipped into the ledges 73 of the legs 57 and 59. The legs 57 and 59 are of the thicker type so that the tubes 21 and spacers 23 which form the vanes V1 and V4 are held in position by the portions of the lips 52 which extend beyond the ledges 73 in each case. The angles 45 and 49 which define the fourth and second quadrants are next disposed with corresponding legs 67 and 65 respectively abutting the legs 59 and 57 of the angle 51. The non-abutting legs 61 and 63 of these angles 45 and 49 are inclined at approximately 45° to the bench or table on which the assembly is being carried out and the tubes 21 and spacers 23 of vanes V2 and V3 may be disposed on the exposed surfaces of the legs 61 and 63. Once the tubes and spacers of vanes V2 and V3 are mounted, the angle 47 which defines the first quadrant may be disposed with its legs 53 and 55 in abutting relationship with the corresponding legs 61 and 63 of the angles 45 and 49, and the fixture may be secured by the countersunk screws 71. The vanes V1 through V4 may then be secured in the fixture by the set screws 77 extending through the ends of the angles. Before the fixture and vanes are secured the spacers 25 may be properly positioned at the center of the cruciform. After the tubes 21 and spacers 23, 25 for the vanes V1 through V4 are secured in the fixture 43 the run-on-run-off tabs 81 (FIGS. 9, 11) are secured to the lips 42 and extend over the tubes 21 adjacent the ends of the joints 27 and 29 to be welded.

The penetration of the welding and its effectiveness in producing a joint may be set by setting the electron beam voltage, the electron beam current and/or the speed at which the joint is moved in welding relationship with the electron beam during a welding operation. The voltage may be set on the Beam Generator Panel and the current and/or speed on the Control Panel. Usually a convenient speed is adopted; typically such a speed may be 44 inches per minute. The current and voltage for achieving the desired weld may be predetermined by carrying out test welds on specimens having the same dimensions as the tubes to be welded. These specimen welds enable the operator to determine a welding current and voltage to be used. In arriving at this invention, it has been discovered that once these parameters are predetermined the joints in the succeeding operations are reproducible by setting the Electron Beam Generator and Control Panel to the same parameters.

Preparatory to a welding operation, the fixture 43 and the tube assembly are mounted in the carriage 41 with the surface T1 of vane V1 in position to be welded. The welding chamber of the Electron Beam Generator is properly evacuated to a pressure of the order of 1/10 micron by operating the appropriate valves and controls for evacuation.

Once the parameters of the electron beam are set the electron beam is focused on a tungsten target. It is important that the surface of the focusing target be, as precisely as practicable, coextensive with the surface of the joints 27 and 29 to be welded, that is, with the surface of the spacers at the joints 27 and 29. The tungsten target may be mounted on the carriage 41 coextensively with the fixture 43 and the assembly to be welded.

The carriage 41 is then moved so that surface T1 replaces the tungsten target in position to be welded. With the aid of the Optical System the electron beam is centered on a run-off tab 81 at a point coextensive with the center of the spacer to be welded. By viewing the scale 37 on the Optical System the necessary electron beam deflection to assure the impingement of the beam on the joint 27 to be welded can be determined. This deflection is achieved by impressing the proper direct current on the deflecting coils DC. Once the deflection is set the carriage drive motor switch SW1 and the beam switch SW2 are actuated on the Switch Unit and the joint to be welded is advanced with the beam impinging on the joint and the weld is carried out. In the preferred practice of this invention, a greater area of the beam should impinge on the spacer than on the tube.

Once the joints 29 on the surface T1 of the vane V1 are welded, the fixture is rotated clockwise through 90° about the axis of the cruciform and the surface T2 of the vane V2 is welded. Then, the fixture is rotated clockwise again through 90° and the joints 29 on the surface T3 are welded. The fixture is then rotated further through 90° and the joints 29 on the surface T4 are welded. Thereafter, the fixture 43 is removed from the carriage 41, rotated in a horizontal plane through 180° and reinserted in the carriage 41. The surface B3 of vane V3 is then in the position originally occupied by the surface T1; B2 is in the position originally occupied by T2; B1 is in the position occupied by T3; and B4 is in the position occupied by T4. Another sequence of welding operations is now carried out. In this case the joints 29 of the surface B3 are first welded; then the fixture is rotated in a clockwise direction through 90° and the joints 29 of surface B2 are welded; then the fixture 43 is rotated in a clockwise direction through another 90° and the joints 29 on the surface B1 are welded. Finally, the fixture is rotated through a further 90° and the joints 29 on the surface B4 are welded.

The joints 27 between the center spacers and the tubes at the center are not as yet welded. Prior to this latter welding operation each of the vanes V1, V2, V3 and V4 is removed from the fixture and checked for leakage. Any leaks discovered on any vane are repaired or the vane is replaced. Once the integrity of the vanes V1 through V4 has been established the vanes are remounted in the fixture 43 and the center joints 27 are welded as just described.

Figure 1:
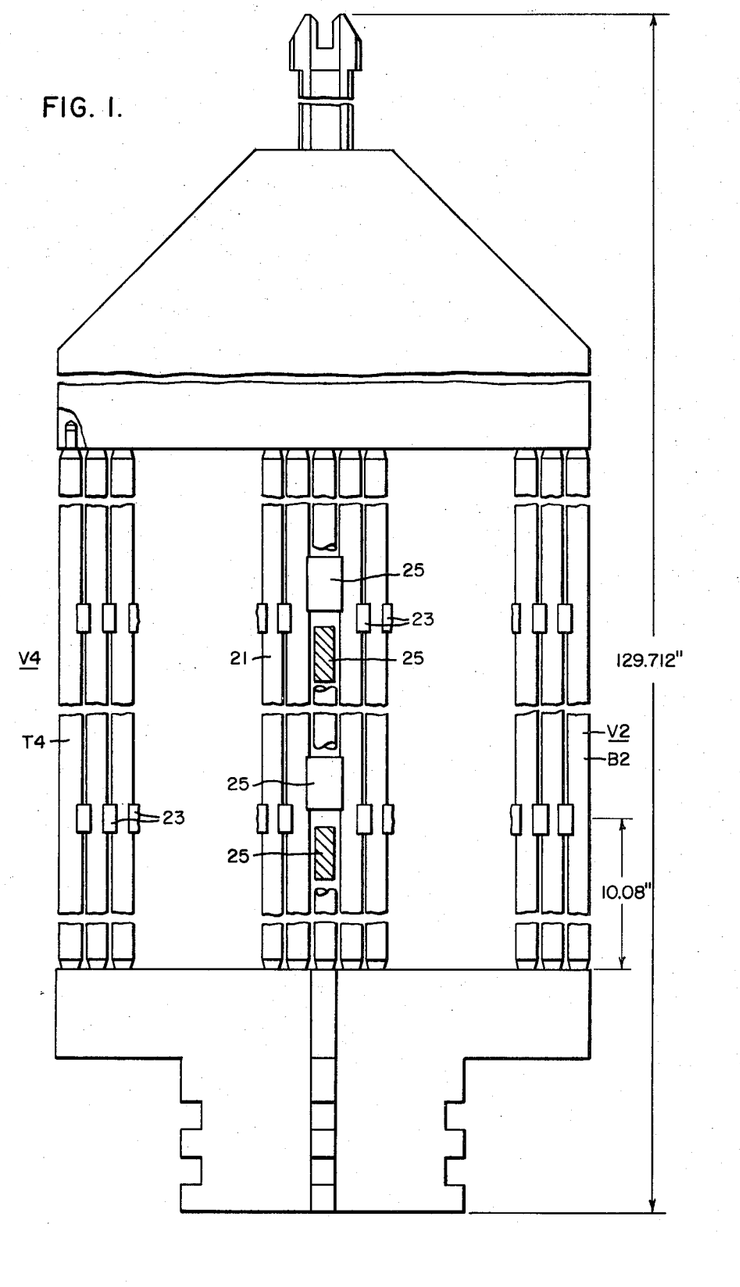
FIGURE 1 is a view in side elevation showing a typical tube assembly which is made in the practice of this invention.
Figure 2:
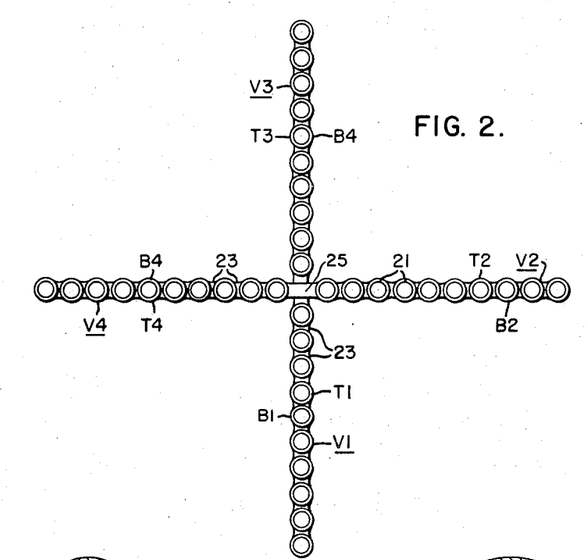
FIG. 2 is a view in end elevation of this assembly with the tip of the assembly removed.
Figure 3:
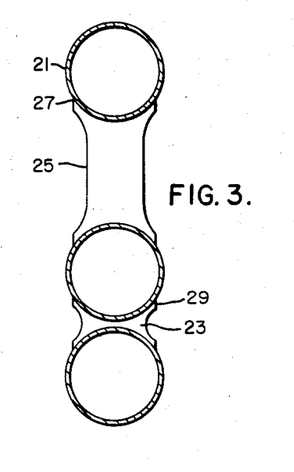
FIG. 3 is a fragmental view in end elevation showing the relationship between spacers and their respective contiguous tubes at the center of the assembly and just below the center of the assembly.

In welding a typical cruciform assembly as shown in FIG. 1, 1368 joints are welded. In the practice of this invention remarkable success has been achieved in welding the cruciforms. The following Table I shows the parameter used in successfully welding the cruciforms.

TABLE I

| Material | Tube wall thickness in inches | Beam potential, kilovolts | Beam current, milliamperes | Speed of joint during welding, inches per minute |
| --- | --- | --- | --- | --- |
| 304 stainless | .010 | 88 | 1.00 | 44 |
| Do | .017 | 100 | 1.25 | 44 |
| Do | .031 | 110 | 1.75 | 44 |

In each of the above welding operations the beam impinged on the joint with about two-thirds of its diameter overlapping the spacer and one-third overlapping the tube.

The welds made in the practice of this invention were compared with welds of like materials and structures produced by welding in an inert gas with a non-consumable electrode. For the purpose of this comparison welds were produced by non-consumable-electrode welding and by electron beam welding, and photomicrographs were produced and compared.

Figure 12A:
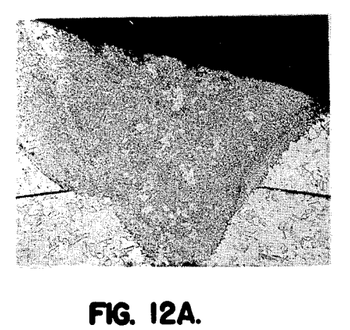
FIG. 12 presents copies of a plurality of photomicrographs of spacer-tube welds produced by tungsten-arc welding.
Figure 12B:
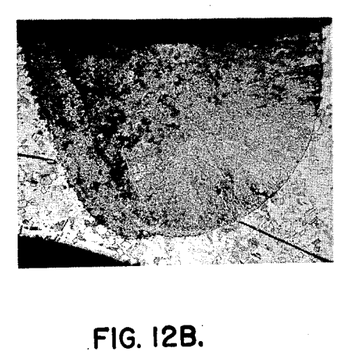
Figure 12C:
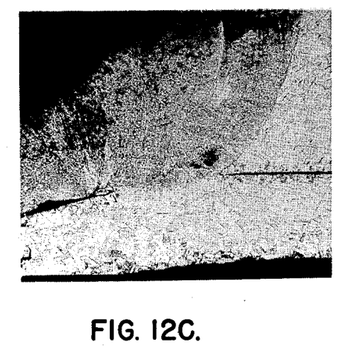

FIG. 12 shows the photomicrographs of three welds of joints 29 of spacer 23 and tubes 21 produced by non-consumable electrode welding with the arc gap about .025 inch. In carrying out the welding, the arc current was maintained at welding magnitude for one second and thereafter reduced gradually to a lower magnitude to suppress the formation of craters. FIG. 12A shows an over-penetrated weld; FIG. 12B shows a reasonably satisfactory weld; and FIG. 12C an under-penetrated weld. It is seen that there is a wide range of divergence among the welds, A, B and C.

Figure 13:
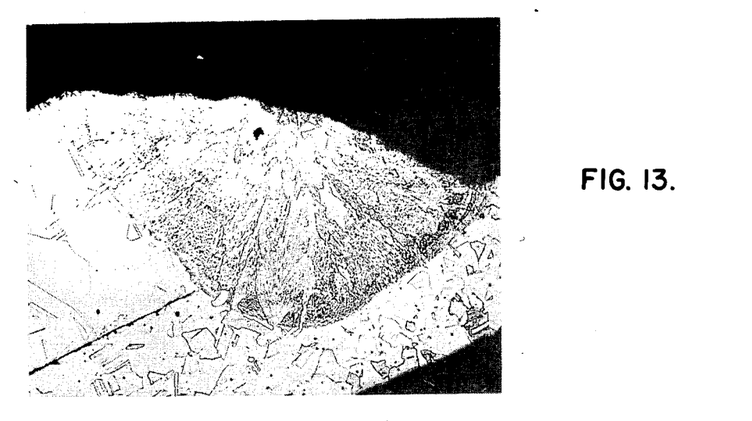
FIG. 13 presents a copy of a photomicrograph of a spacer-tube weld produced in the practice of this invention.

FIG. 13 is a photomicrograph of a weld produced in the practice of this invention with the beam moving linearly along the joint and not oscillating. This photomicrograph was represented at 100 times magnification. The photomicrograph shows the precision which can be achieved in the practice of this invention.

Figure 14A:
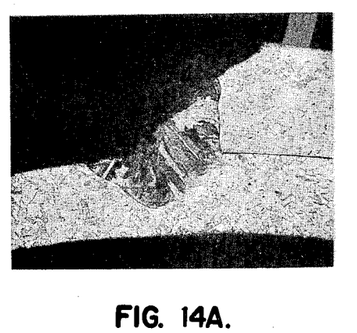
FIG. 14 presents copies of photomicrographs of spacer-tube welds produced in the practice of a modification of this invention.
Figure 14B:
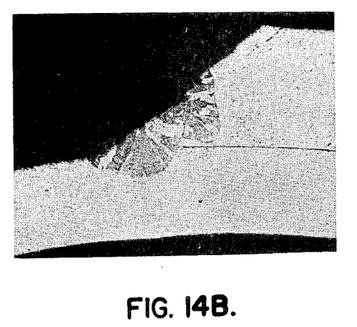
Figure 14C:
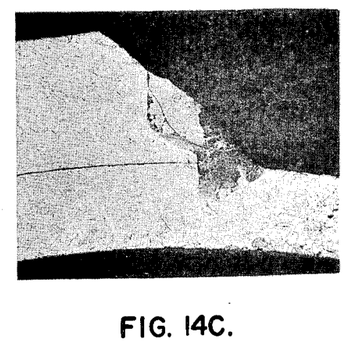

FIGS. 14A, B and C show photomicrographs of welds produced with an electron beam having a potential of 60 kilovolts and conducting 2.5 milliamperes. The work was moved at 60 inches per minute and the electron beam was subjected to circular oscillation, the circle of oscillation having a diameter of .010 inch.

FIG. 14A shows a joint 29 between a spacer 23 and a tube 21 for which the penetration was satisfactory. FIG. 14B shows a slightly under-penetrated weld. FIG. 14C shows a weld in which the penetration is satisfactory. The range of variation among FIGS. 14A, 14B and 14C is relatively small and these photomicrographs further demonstate the reproducibility of the method of welding in accordance with this invention.

To aid in the understanding of this invention, the following brief summary is presented.

This invention relates to apparatus for electron-beam welding of spacers 23 or 25 to tubing 21. Typically, the spacers 23 or 25 and the tubing 21 may be composed of stainless steel. The method and apparatus according to this invention were developed for electron beam welding of spacers to tubing and to obtain a weld penetration into the tubing wall to a closely controlled depth as illustrated in FIG. 4. Typically, this invention is applicable for electron beam welding of stainless steel spacers 23 or 25 having a maximum width of 5/16 inch, to stainless steel tubing 21 having a wall thickness as thin as 0.010 inch. The invention has been used for welding of tube assemblies for power generating equipment and has produced electron beam welds of consistent good quality. Typically, more than 1000 spacer-to-tube weldments are required for fabrication of such a tube assembly.

Conventional welding methods, such as TIG welding, do not provide sufficient control to obtain consistently good quality for the large number of weldments required. This invention is based on the discovery that to fabricate these tube assemblies by electron beam welding is highly satisfactory. The invention produces the desired weld penetration and quality and minimizes the set up time needed to position the electron beam at a precise location for each weld. FIG. 10 shows the relationship of the electron beam 39 and the joint 37 in carrying out the basic proceess.

The electron beam welding apparatus disclosed herein includes beam deflection control, and with this control it is possible to deflect the beam to a precise location for welding. For electron beam welding spacers to tubes as described above, it is possible to weld both sides of one spacer without moving the spacer in the transverse direction. As illustrated in FIG. 10, the beam is deflected in the transverse direction (upwardly or downwardly as viewed by FIG. 10) to make both weld joints. This invention includes within its scope the transverse beam-deflection technique.

While a preferred embodiment of this invention has been disclosed herein, many modifications thereof are feasible. This invention, then, is not to be restricted except insofar as is necessitated by the spirit of the prior art.

I claim as my invention:

1. The method of metallurgically joining a spacer to adjacent thin-walled tubes with an electron beam, capable of being deflected, comprising placing said spacer between said tubes thus forming joints to be welded between each of said tubes and said spacer, providing run-off-run-on tabs at the ends of said joints along the direction of said joints, and joining said spacer to said tubes at each of said joints as follows:
    (a) centering said spacer with respect to said beam in its undeflected position,
    (b) setting said spacer and tubes relative to said beam so that said beam impinges on one of said tabs,
    (c) deflecting said beam so that said beam impinges at a point of said one tab, which point is along the extension of a said joint, and
    (d) moving said spacer and tubes and said beam relative to each other so that said beam progressively impinges along said last-named joint, producing a weld at said joint, and at the end of said joint said beam impinges on said other tab, the parameters of the beam and the rate of said relative movement being preset so that said weld is produced with the required reproducible precision.

2. The method of metallurgically joining a spacer to adjacent thin-walled tubes with an electron beam, capable of being deflected, comprising placing said spacer between said tubes thus forming joints to be welded between each of said tubes and said spacer, providing run-off-run-on tabs at the ends of said joints along the direction of said joints, the run-off-run-on surfaces of said tabs defining planes parallel to said joints, and being as near as practicable to said joints, and joining said spacer to said tubes at each of said joints as follows:
    (a) centering said spacer with respect to said beam in its undeflected position,
    (b) setting said spacer and tubes relative to said beam so that said beam impinges on one of said tabs,
    (c) deflecting said beam so that said beam impinges at a point on said one tab, which point is along the extension of said joint, and
    (d) moving said spacer and joint and said beam relative to each other so that said beam progressively impinges along said last-named joint producing a weld at said joint, and at the end of said joint, said beam impinges in said other tab, the parameters of the beam and the rate of said relative movement being preset so that said weld is produced with the required reproducible precision.

3. The method of claim 1 wherein the beam is deflected as provided in paragraph (c) of claim 1 so that the beam overlaps the tube and also overlaps the spacer at each joint but the overlap by the beam of said spacer is of substantially larger area than the overlap by the beam of said tube, whereby excessive fusion of said tube is prevented.

4. The method of metallurgically joining a spacer to adjacent thin-walled tubes, comprising placing said spacer between said tubes thus forming joints to be welded between each of said tubes and said spacer, and weld joining said spacer to said tubes at each of said joints by deflecting said beam into alignment with each said joint in its turn and moving said spacer and tubes and said beam relative to each other so that said beam progressively impinges along said last-named joint, producing a weld along said joint the parameters of the beam and the speed of relative movement being such that said weld is confined only to the region of said joint.

5. The method of claim 4 wherein the tubes have a wall thickness of the order of .01 inch.

References Cited

UNITED STATES PATENTS

| | | | |
|---|---|---|---|
| 1,512,787 | 10/1924 | Morton | 219—137 |
| 1,844,407 | 2/1932 | Murray | 219—137 X |
| 2,719,210 | 9/1955 | Chapman | 219—137 |
| 3,221,135 | 11/1965 | Maier | 219—137 |
| 3,246,117 | 4/1966 | Smith | 219—137 |

RICHARD M. WOOD, *Primary Examiner.*

B. A. STEIN, *Assistant Examiner.*